Patented Aug. 17, 1926.

1,596,325

UNITED STATES PATENT OFFICE.

ANDRÉ RAOUL WAHL, OF ENGHIEN, FRANCE, ASSIGNOR OF ONE-HALF TO SOCIÉTÉ ANONYME DES MATIÈRES COLORANTES ET PRODUITS CHIMIQUES DE SAINT DENIS, OF PARIS, FRANCE.

PROCESS FOR THE SEPARATION OF ORTHO-CHLOROTOLUENE AND PARA-CHLOROTOLUENE.

No Drawing. Application filed February 23, 1921, Serial No. 447,249, and in France March 6, 1920.

The action of chlorine on toluene in the cold in presence of suitable catalysts is exclusively on the nucleus and a mixture of ortho- and para-chlorotoluene is always produced.

The constituents of the mixture thus obtained cannot be separated by physical processes. The boiling points of the isomeres are too close together to allow of fractionation even by the most improved apparatus, and separation by crystallization is impracticable since the ortho-chlorotoluene has a very low melting point ($-34°$). Owing to these difficulties ortho-chlorotoluene, which is a parent material of great importance, has always been made technically either by synthetic methods or by indirect methods (Erdmann & Kirchoff, Ann. Chem. Vol. 247, page 368; German Patent Specification No. 294,638).

Seelig (Ann. Chem. Vol. 237, page 151) has tried to separate the chlorotoluenes from the crude mixture by using the great tendency that ortho-chlorotoluene has for sulphonation and at the same time the ease with which the salts of the sulpho-derivative crystallize, which permits isolation in a pure state by fractional crystallization Thus, by treating the mixture of chlorotoluenes with two parts of very concentrated sulphuric acid (specific gravity=1.85) or one part of fuming sulphuric acid, he obtained impure para-chlorotoluene and by fractional crystallization pure sodium or calcium ortho-chlorotoluene sulphonate; he could not in this manner prepare pure para-chlorotoluene in satisfactory yield and states expressly (Ann. Chem. Vol. 237, page 155) that a complete purification by the action of sulphuric acid appears problematical and incapable of advantageous application.

As above set forth, an incomplete sulphonation of the mixtures has already been proposed, in combination with other reactions, without in any case reaching the desired result. But after long and careful researches, I have obtained an unexpected result consisting in the fact that I am enabled to use the incomplete sulphonation as exclusive and sufficient means for the economical and practical separation of the two chlorotoluols, by observing two conditions which escaped the attention of Seelig. The action of the sulphuric acid will be modified, firstly since the operation is carried out considerably below the boiling point of chlorotoluol, and secondly because the duration of the reaction is limited in an exact manner.

The whole of the para-derivative may be left intact by the sulphonation, if care is taken to stop the reaction while there still remains unaltered a suitable proportion of the ortho-isomere. There is thus obtained ortho-chlorotoluene sulphonic acid from which the chlorinated hydrocarbon may be regenerated by simple hydrolysis.

On the other hand, when the para-chlorotoluene is to be isolated, the sulphonation is conducted in such a manner as to transform the whole of the ortho-isomere as well as a small proportion of the para-isomere into sulphonic acid, whereupon it is possible to separate para-chlorotoluene practically pure and in substantially quantitative yield.

The invention is illustrated by the following examples, the parts being by weight:—

*Example 1.*—40 parts of a mixture of chlorotoluenes containing 60 per cent of the ortho- and 40 per cent of the para-derivative are heated in an apparatus having a stirrer with 75 parts of ordinary sulphuric acid of 93–93.5 per cent strength at 114–115° C. for about 2½ hours. The operation is then stopped and the supernatant oil is separated by decantation, or better by a current of steam. There are thus obtained 20 parts of a chlorotoluene boiling at 158–160° C., crystallizing at $-4°$ C. and consisting of 4.2 parts or 21 per cent ortho-chlorotoluene and 15.8 parts, or 79 per cent para-chlorotoluene.

Thus the ortho-derivative has alone been sulphonated, since over 98 per cent of the para-derivative contained in the original mixture has been recovered.

*Example 2.*—The sulphuric acid solution which remains after the distillation in steam, described in the foregoing example, contains the sulphonic acid to which Wynne (Chem. Soc. T. Vol. 61, page 1,072, 1892) has ascribed the orientation

It is concentrated until it boils at about

175–185° C. at which point the sulphonic acid SO₃H group has become hydrolyzed and can be distilled in a current of steam, superheated or not, with excellent yield.

*Example 3.*—50 parts of chlorotoluene containing 22 parts of the ortho-derivative and 78 parts of the para-derivative are heated with 40 parts of ordinary sulphuric acid of 93–93.5 per cent strength at 114–115° C. for about 3 hours; the supernatant oil is separated as described in example 1. There are thus recovered 38 parts of a product boiling at 159–161° C. and crystallizing at +4.5° C. it consists of para-chlorotoluene of 97 per cent purity, that is to say, nearly 95 per cent of the para-derivative contained in the original mixture has been recovered.

The hydrolysis of the sulphuric acid solution furnishes only a small proportion of the chloro-derivatives, which is carried over to another operation.

Having now described the nature of the said invention and the best means I know of carrying the same into practical effect, I claim:—

1. A process for the separation of ortho-chlorotoluene and parachlorotoluene from mixtures containing the same which includes submitting the mixture to sulfonation at a temperature ranging from 90° to 120° C. for a period varying from two to three hours.

2. A process for the separation of ortho-chlorotoluene and parachlorotoluene from mixtures containing the same consisting exclusively in submitting the mixture to sulphonation at temperatures ranging from 90° to 120° C., these temperatures being 40° to 70° below the boiling point of the monochlorotoluene, and during two to three hours, in driving off by suitable means the unsulphonated part, consisting chiefly of parachlorotoluene, and in heating the remaining solution until its boiling point reaches 175° to 180°, when the orthochlorotoluene distills over.

3. A process for the separation of ortho-chlorotoluene and parachlorotoluene from mixtures containing the same consisting exclusively in submitting the mixture to sulphonation, at temperatures ranging from 90° to 120° C., for two to three hours, isolating the unsulphonated part, consisting chiefly of parachlorotoluene, by decantation, and heating the remaining solution until its boiling point reaches 175° to 180°, when the orthochlorotoluene distills over.

In testimony whereof I have signed this specification.

ANDRÉ RAOUL WAHL.